US006984039B2

(12) United States Patent
Agostinelli

(10) Patent No.: US 6,984,039 B2
(45) Date of Patent: Jan. 10, 2006

(54) LASER PROJECTOR HAVING SILHOUETTE BLANKING FOR OBJECTS IN THE OUTPUT LIGHT PATH

(75) Inventor: John A. Agostinelli, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 31 days.

(21) Appl. No.: 10/725,179

(22) Filed: Dec. 1, 2003

(65) Prior Publication Data

US 2005/0117132 A1    Jun. 2, 2005

(51) Int. Cl.
G03B 21/00    (2006.01)
G03B 21/26    (2006.01)
(52) U.S. Cl. ........................................ 353/28; 353/122
(58) Field of Classification Search ................ 353/28, 353/97, 122; 348/586, 590, 607; 382/173
See application file for complete search history.

(56) References Cited

U.S. PATENT DOCUMENTS

| | | | |
|---|---|---|---|
| 5,117,221 A * | 5/1992 | Mishica, Jr. ................. 353/122 |
| 5,311,360 A | 5/1994 | Bloom et al. ................. 359/572 |
| 5,325,133 A | 6/1994 | Adachi ......................... 351/209 |
| 5,432,863 A | 7/1995 | Benati et al. ................. 382/167 |
| 5,706,061 A | 1/1998 | Marshall et al. .............. 348/43 |
| 5,719,951 A | 2/1998 | Shackleton et al. .......... 382/118 |
| 6,002,505 A | 12/1999 | Kraenert et al. ............. 359/196 |
| 6,124,647 A * | 9/2000 | Marcus et al. ................. 353/13 |
| 6,126,288 A * | 10/2000 | Hewlett ......................... 353/28 |
| 6,134,339 A | 10/2000 | Luo ............................... 382/115 |
| 6,184,926 B1 * | 2/2001 | Khosravi et al. ............. 382/190 |
| 6,301,370 B1 | 10/2001 | Steffens et al. .............. 382/103 |
| 6,307,663 B1 | 10/2001 | Kowarz ........................ 359/231 |
| 6,361,173 B1 * | 3/2002 | Vlahos et al. ................ 353/122 |
| 6,411,425 B1 | 6/2002 | Kowarz et al. .............. 359/291 |
| 6,476,848 B2 | 11/2002 | Kowarz et al. .............. 347/255 |
| 6,554,431 B1 * | 4/2003 | Binsted et al. ................. 353/28 |
| 6,575,581 B2 | 6/2003 | Tsurushima .................. 353/121 |
| 6,598,979 B2 | 7/2003 | Yoneno ........................ 353/122 |
| 6,600,830 B1 | 7/2003 | Lin et al. ...................... 382/118 |
| 6,789,903 B2 * | 9/2004 | Parker et al. ................... 353/28 |
| 6,799,850 B2 * | 10/2004 | Hong et al. .................. 353/122 |
| 6,811,267 B1 * | 11/2004 | Allen et al. .................. 353/122 |
| 6,840,627 B2 * | 1/2005 | Olbrich ........................ 353/122 |
| 2002/0145806 A1 | 10/2002 | Amm ........................... 359/618 |
| 2004/0165154 A1 | 8/2004 | Kobori et al. ................. 353/69 |

FOREIGN PATENT DOCUMENTS

EP    1 365 584 A2    11/2003
JP    2000 305481    11/2000

* cited by examiner

Primary Examiner—Christopher Mahoney
(74) Attorney, Agent, or Firm—Stephen H. Shaw

(57) ABSTRACT

A projection apparatus (18) forms an image frame (22) on a display surface (12), where the image frame (22) is a two-dimensional array of pixels. The projection apparatus (18) has a laser (40) light source, an image modulator (42) for forming an image-bearing beam according to scanned line data, and projection optics (44) for projecting the image-bearing beam toward the display surface (12). A camera (20) obtains a sensed pixel array by sensing the two-dimensional array of pixels from the display surface (12). A control logic processor (28) compares the sensed pixel array with corresponding image data to identify any portion of the image-bearing beam that is obstructed from the display surface (12) and to disable obstructed portions of the image-bearing beam for at least one subsequent image frame (22).

44 Claims, 9 Drawing Sheets

LASER PROJECTOR HAVING SILHOUETTE BLANKING FOR OBJECTS IN THE OUTPUT LIGHT PATH

RELATED APPLICATIONS

This application is related to the following copending U.S. patent application of the same assignee:
"High-Contrast Display System with Scanned Conformal Grating Device" U.S. Ser. No. 10/171,252, filed Jun. 12, 2002 in the names of Marek W. Kowarz and James G. Phalen.

FIELD OF THE INVENTION

This invention generally relates to projection apparatus employing scanned laser light sources and more particularly relates to a laser projector that responds to an object detected in the output path by disabling the laser over at least a portion of the scan corresponding to the object.

BACKGROUND OF THE INVENTION

Numerous types of electronic projection apparatus have been proposed for projecting digital images. Currently, projection apparatus of this type serve primarily for business presentations and other types of projection apparatus. However, in the future, electronic projection apparatus are expected to compete with conventional film-based projectors, such as in movie theaters. Electronic projectors are also likely candidates for use in the front-projection home theater market. Among the more promising solutions for electronic imaging, laser projection offers a number of advantages over other light sources, with benefits including wide color gamut and high efficiencies, for example.

Linear SLMs, which could also be considered as one-dimensional spatial light modulators, have some advantages over two-dimensional LCD and DMD area spatial light modulators that have typically used for business projection systems. Inherent performance advantages for linear modulator arrays include the capability for higher resolution at reduced cost. In addition, linear arrays are more suitable modulators for laser light than are their two-dimensional LCD and DMD counterparts. Grating Light Valve (GLV) linear arrays, as described in U.S. Pat. No. 5,311,360 (Bloom et al.) are one earlier type of linear modulator array that offers a workable solution for high-brightness imaging using laser sources, for example.

Recently, an electromechanical conformal grating device consisting of ribbon elements suspended above a substrate by a periodic sequence of intermediate supports was disclosed by Kowarz in commonly assigned U.S. Pat. No. 6,307,663, entitled "Spatial Light Modulator With Conformal Grating Device" issued Oct. 23, 2001. The electromechanical conformal grating device is operated by electrostatic actuation, which causes the ribbon elements to conform around the support substructure, thereby producing a grating. The device of '663 has more recently become known as the conformal GEMS device, with GEMS standing for Grating ElectroMechanical System. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system, providing a high degree of system flexibility and allowing the use of lower cost optics. When used with laser sources, GEMS devices provide excellent brightness, speed, and contrast.

Commonly assigned U.S. Pat. Nos. 6,411,425 and 6,476,848 (both to Kowarz et al.) disclose imaging systems employing GEMS devices in a number of printing and display embodiments. As with its GLV counterpart, a GEMS device modulates a single color and a single line of an image at a time. Thus, forming a color image using GLV or GEMS devices requires suitable techniques either for sequencing illumination and modulation data for each color to a single linear modulator or for combining separately modulated color images. Other types of modulators, such as LCD and Digital Micromirror Device (DMD) area spatial light modulators, could be used for forming color images by modulating a laser light source; however, inherent cost, performance, and/or color quality drawbacks with these devices make them less desirable candidates for laser-based projection apparatus.

Although laser light offers advantages such as good color gamut and long component lifetimes, potential hazards associated with scanned coherent laser light are a concern that hinders development efforts to provide commercial quality laser projection. Projection of laser light onto a diffuse screen effectively scatters the coherent beam, so that the resulting displayed image may be enjoyed without safety concerns. However, a lingering area of concern for employing laser projectors relates to inadvertent, accidental exposure to laser illumination caused when an observer, located within the projected laser beam's path, looks back into the projector. With conventional light-based projectors, a person inadvertently gazing back into the projector would certainly find it uncomfortable to maintain her gaze, but would not risk serious eye damage. With laser-based projectors, however, a viewer can be at higher risk of eye damage, unless some form of protection is provided. Lasers proposed for use in projection apparatus may have output power in the range of 0.5 to 20 watts, or even higher.

Interlocks are one conventional method for disabling laser illumination when a protective cover is removed or when some other event indicates that built-in safety features for a laser device have been compromised. In order to implement interlock protection, some type of sensor must be activated or a hard-wired connection must be interrupted. However, conventional interlock solutions would not be well suited for disabling laser-based projection when an audience member or some type of object is interposed in the path of projected light.

Laser light show systems in current use employ a safety feature known as velocity threshold interlock. Rapidly scanning beams dramatically reduce the exposure level of the scanning spot compared non-scanned or slowly scanning beams. The laser light show projector systems monitor the angular velocities of their scanner sub-systems and blank the beams when velocities fall below a predetermined threshold. The feature guards against the possibility of high projected laser irradiance which would occur if, for example, the scanner used in such systems failed to scan the beam.

However, the aforementioned method of blanking the entire display screen is particularly annoying for many in the audience. Thus, it can be seen that there is a need for a digital projection apparatus that takes advantage of laser brightness, but minimizes imposing annoyance upon the viewing audience, should an obstruction occur within the laser beam's path.

SUMMARY OF THE INVENTION

The aforementioned need is met by the present invention providing a projection apparatus for forming an image frame on a display surface, wherein the image frame comprises a two-dimensional array of pixels, the apparatus comprising:

(a) a projector for directing an image-bearing beam toward the display surface, comprising:
  (i) a laser light source;
  (ii) an image modulator for modulating said laser light source to form said image-bearing beam, according to image data;
  (iii) projection optics for projecting said image-bearing beam toward the display surface to form the image frame;
(b) a camera for obtaining a sensed pixel array by sensing the two-dimensional array of pixels of the image frame formed on the display surface by said image-bearing beam;
(c) a control logic processor for comparing said sensed pixel array with corresponding said image data for the image frame to identify any portion of said image-bearing beam that is obstructed from the display surface and for disabling pixels within said obstructed portion of said image-bearing beam for at least one subsequent image frame.

ADVANTAGES

It is a feature of the present invention that it provides an apparatus and method for selectively blanking some portion or all of a modulated light beam from a laser source, depending on the sensed condition.

It is an advantage of the present invention that it provides a method for updating information on obstruction of the display surface, allowing scanned lines to be re-enabled when tested for the continuing presence of an obstructing person or object.

It is a further advantage of the present invention that, by disabling only an obstructed portion of the display screen, it allows other, unobstructed parts of the display screen to be used.

It is yet a further advantage of the present invention that it provides a method for sensing and disabling laser projection in the event of failure in scanning system components.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

To facilitate understanding, identical reference numerals have been used, where possible, to designate identical elements that are common to the figures.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Laser-based projection devices form a two dimensional image by modulating and scanning a laser beam across a display surface, effectively tracing out successive rows or columns of spaced-apart pixel positions, where pixel-to-pixel spacing is typically equal throughout an image. One example of a laser-based projection device is disclosed in U.S. Pat. No. 6,476,848 (Kowarz et al.), the disclosure of which is incorporated herein by reference.

Figure 1:
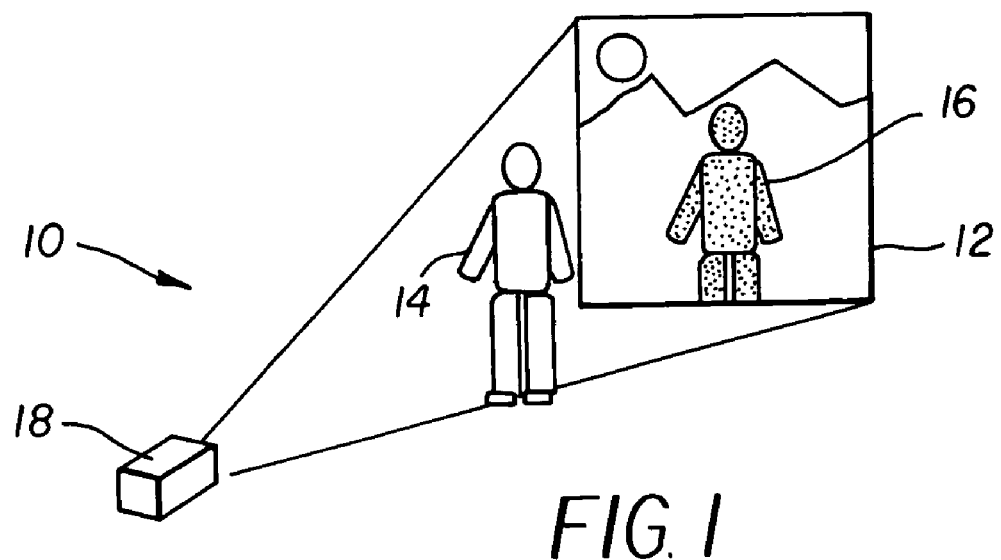
FIG. 1 is a perspective diagram showing a prior art laser-based projection apparatus.

Referring to FIG. 1, there is shown a simplified perspective diagram of a front-projection system 10 comprising a laser-based projection apparatus 18, such as the projector of the Kowarz et al. disclosure, projecting onto a display surface 12. A viewer 14 is standing in the path of the projected beam, casting a shadow and causing an obstructed area 16.

Figure 2:
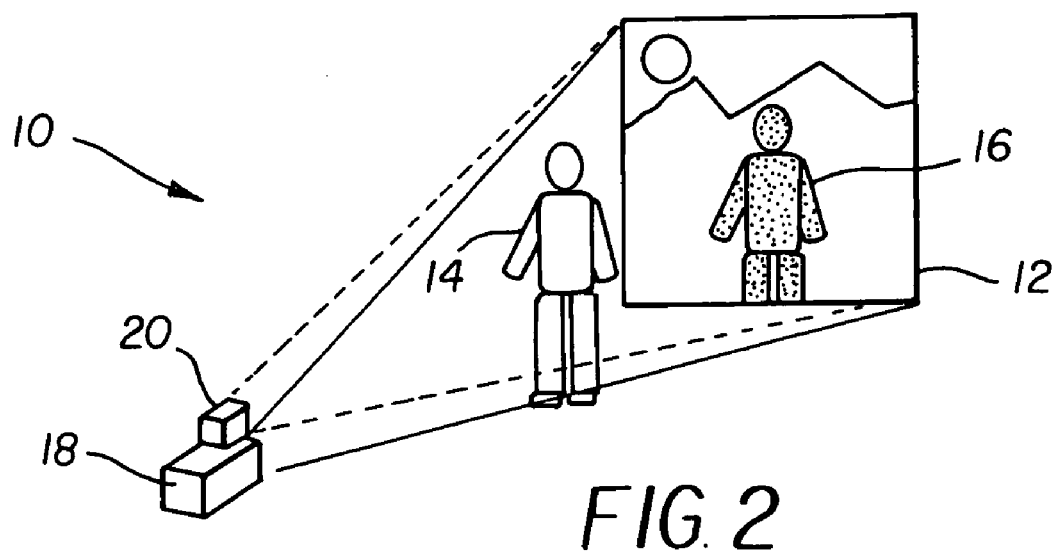
FIG. 2 is a perspective diagram showing an embodiment of the present invention, with a digital camera for sensing discrepancies between the image as projected and as actually displayed.

Referring to FIG. 2, there is shown a simplified perspective diagram of front-projection system 10 adapted according to the present invention. An electronic camera 20 is provided for sensing the image displayed on display surface 12. Based on detection by camera 20, projection apparatus 18 is controlled to automatically blank projection over obstructed area 16 and to prevent the laser beam from being directed at viewer 14.

Figure 3A:
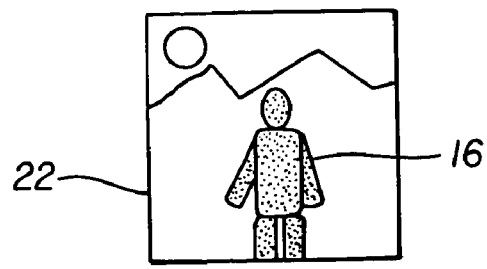
FIG. 3a is a plane view showing the shadow of a viewer as it would appear on the display surface.
Figure 3B:
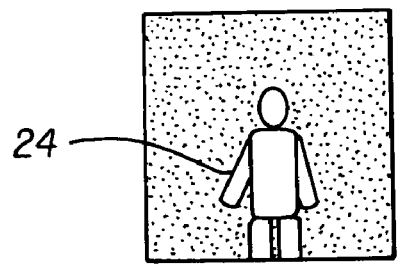
FIG. 3b is a plane view showing a difference frame derived from a sensed digital camera image of a projected frame in an example where an audience member or an object of some kind comes between projection optics and the display surface.
Figure 3C:
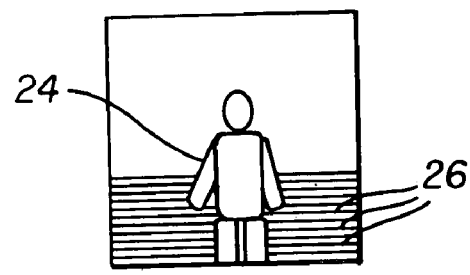
FIG. 3c is a plane view representing partial scan lines for forming the difference frame of FIG. 3b.

Referring to FIG. 3a, there is represented the silhouette of obstructed area 16 over an image frame 22, as sensed by camera 20 in the configuration of FIG. 2. Control logic is used to compare the expected image for display, based on image data provided to projection apparatus 18, against the sensed image feedback from camera 20. Based on this comparison, the logic generates a difference frame 24, as is shown in FIG. 3b. As is represented in FIG. 3c, protection is provided by interrupting scan lines 26 over that portion of difference frame 24 where code values exceed a predetermined threshold value. This is accomplished by modifying signals sent to a linear image modulator 42 (shown in FIG. 8) that generates scan lines 26.

Figure 8:
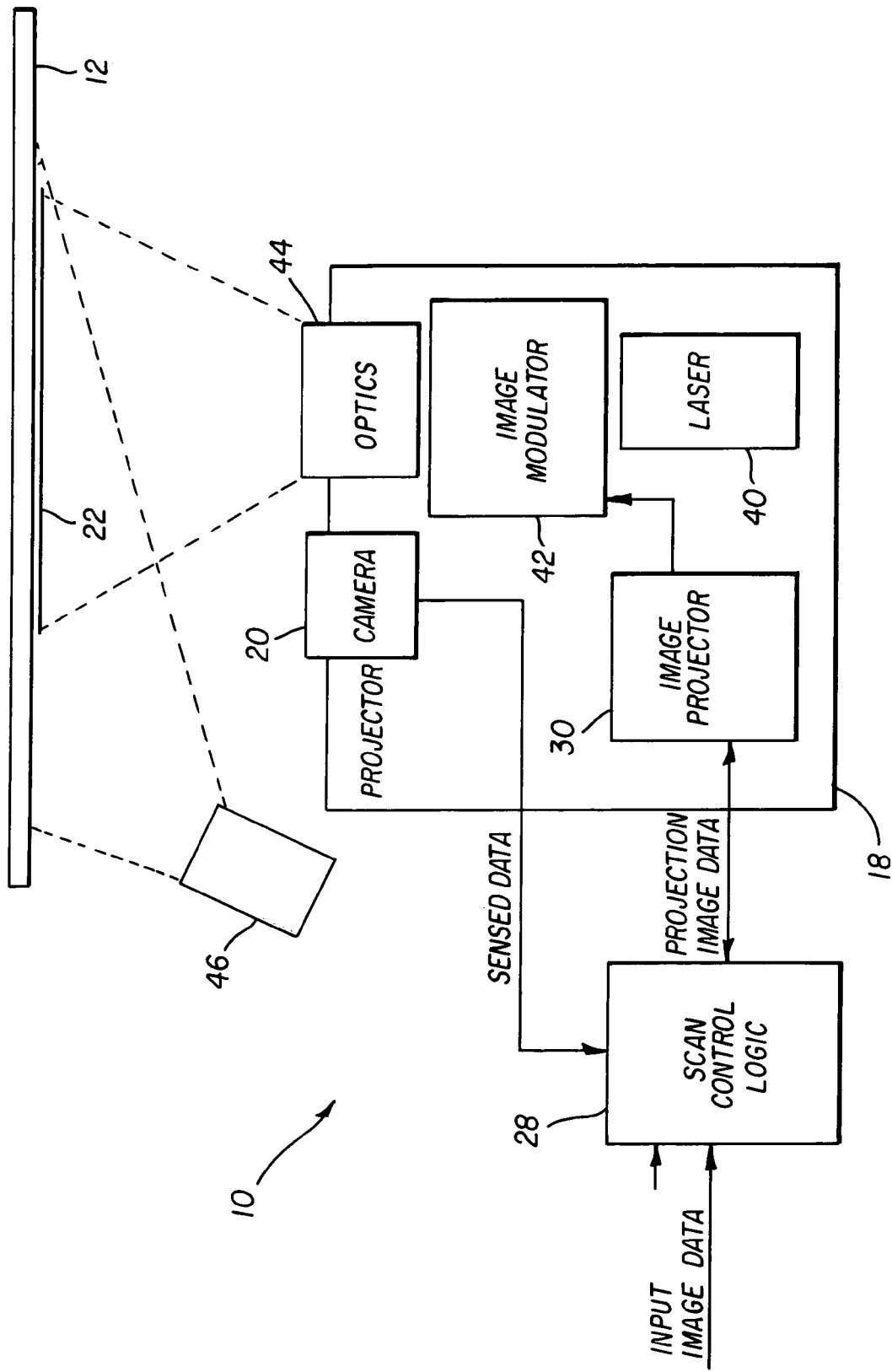
FIG. 8 is a schematic block diagram showing major components of an apparatus of the present invention.

Referring to FIG. 8, there is shown, in block diagram form, a schematic of the overall layout of projection system 10, with a feedback loop for selectively disabling the projection scan, as is represented in FIG. 3c. Projection apparatus 18 modulates source light from one or more lasers 40 at an image modulator 42, based on image data obtained from an image processor 30. Projection optics 44 direct the modulated laser light 43 onto display surface 12 to form image frame 22. Camera 20 senses image frame 22 on display surface 12 and provides the sensed data to a scan control logic processor 28. Scan control logic processor 28 performs the comparison of sensed data against input image data and provides suitably modified projection image data to image processor 30. For the example difference frame 24 of FIG. 3c, scan lines 26 are modified so that no light is projected over the area obstructed by viewer 14.

Scan control logic processor 28 may be a separate logic processing unit, such as a separate computer workstation, or may be integrated with image processor 30 in projection apparatus 18. A number of optional algorithms could be employed by scan control logic processor 28, including eye detection algorithms and facial recognition algorithms, for example, as is described subsequently.

Thus, using algorithms that apply probabilistic techniques and feature recognition, projection apparatus 18 could be accurately controlled to disable laser projection only near the eyes or face of viewer 14, for example. Motion detection algorithms could be deployed to selectively disable appropriate portions of scan lines 26.

Figure 5:
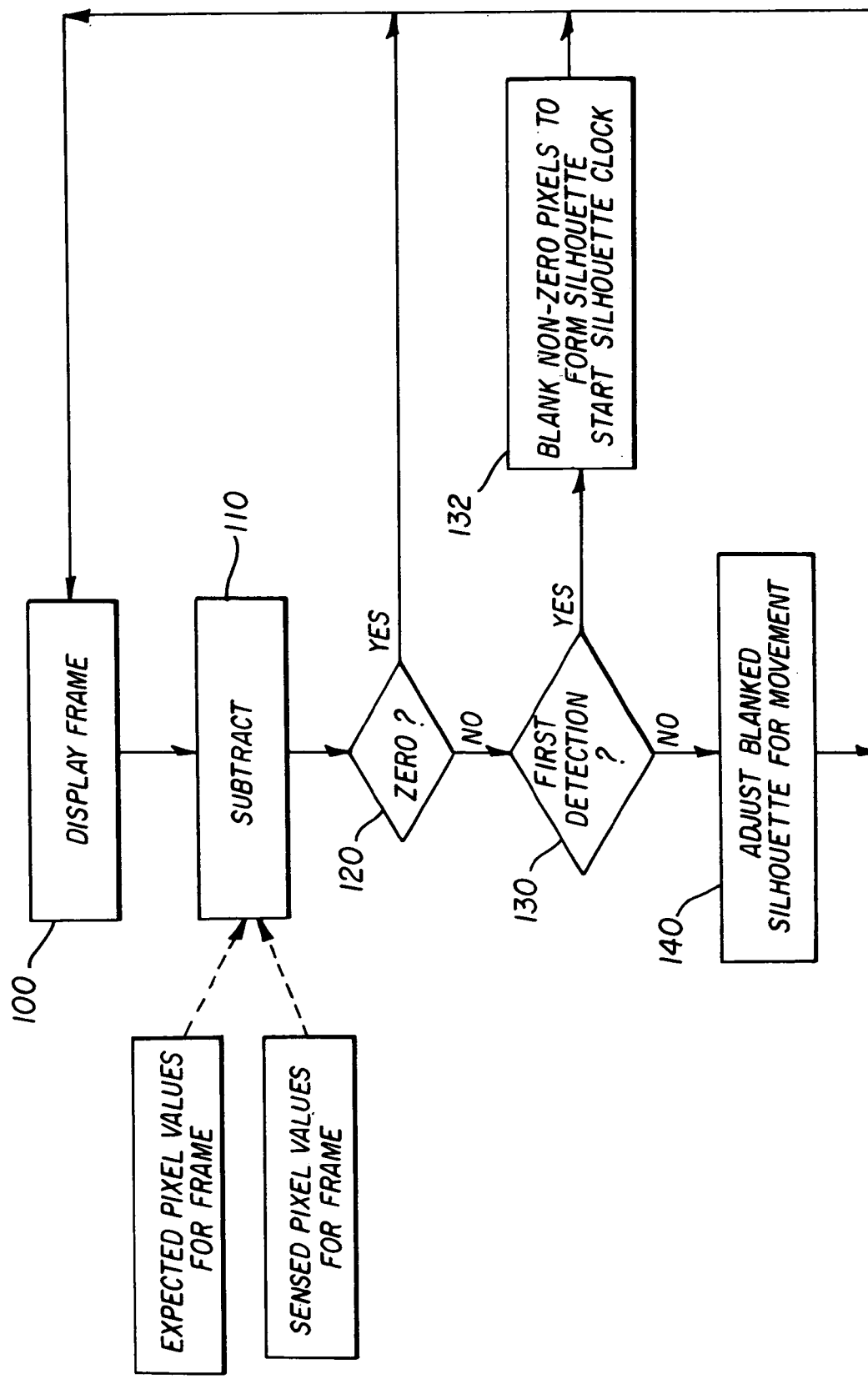
FIG. 5 is a flow chart showing the processing logic for silhouette blanking in an apparatus of the present invention.

Referring to FIG. 5, there is shown a logic flow diagram with the basic steps for the control loop implemented using scan control logic processor 28 of FIG. 8. In a display step 100, frame 22 is displayed, according to projection image data. Scan control logic processor 28 compares expected values against actual sensed values from camera 20, pixel for pixel in a comparison step 110. For each pixel position in frame 22, the difference between the expected value and the sensed value should be zero, or below some suitable nominal threshold, as determined in a threshold query step 120. For any pixel where this is the case, scan control logic processor 28 enables that pixel for the next scan operation (for the following frame 22). However, where there is a difference between the expected pixel value and the sensed value, a subsequent initial detection query step 130 is executed. At the initial detection, an initial blanking step 132 is executed, to remove the affected pixel from the next scan operation. As part of initial blanking step 132, a silhouette clock is started in order to track the number of frames 22 for which each blanked pixel is disabled. If this is not the first scan for which a pixel is disabled, a movement adjustment step 140, described subsequently, is carried out. Activity then loops back to display step 100 for the next frame 22.

Accommodating Movement

Figure 4A:
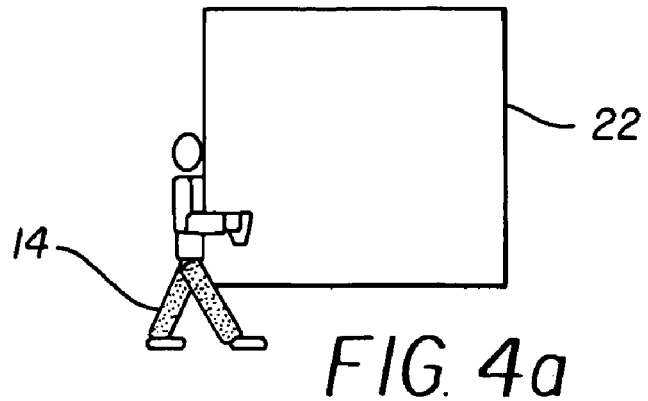
FIGS. 4a–4c are plane views showing movement of a viewer with respect to a stationary reference segment of a projected frame.
Figure 4B:
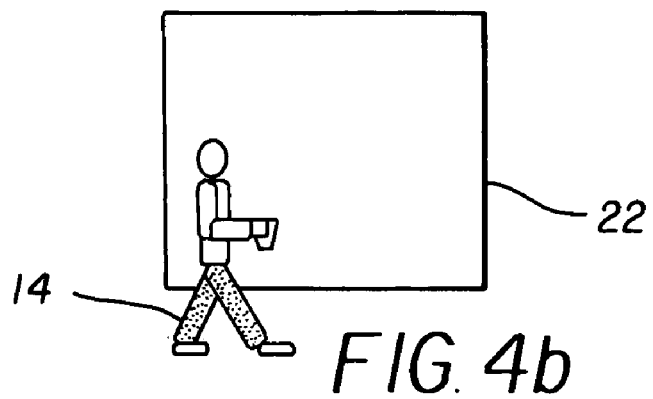
Figure 4C:
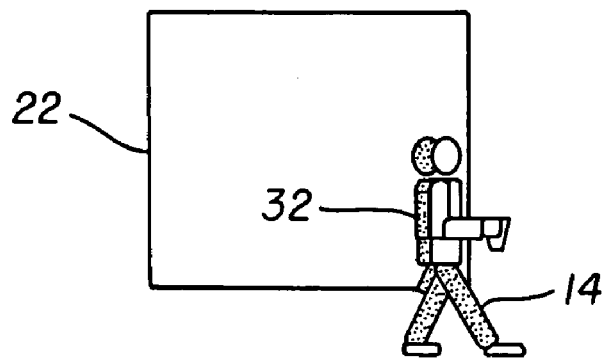

As was noted with reference to FIG. 5, movement adjustment step 140 must be executed in order to reclaim pixels that have been disabled but can be re-enabled. That is, movement adjustment step 140 is needed in order to re-display pixels that are no longer obstructed by viewer 14. Referring to FIGS. 4a–4c, there is shown movement of viewer 14 past image frame 22. As viewer 14 moves to the right, a shadow effect is created by a blanked area 32 that is no longer obstructed by viewer 14, as is indicated in FIG. 4c. The purpose of movement adjustment step 140 is to form blanked area 32 at a suitable size and location, so that previously blanked pixels can be recovered when viewer 14 no longer obstructs them.

Figure 6:
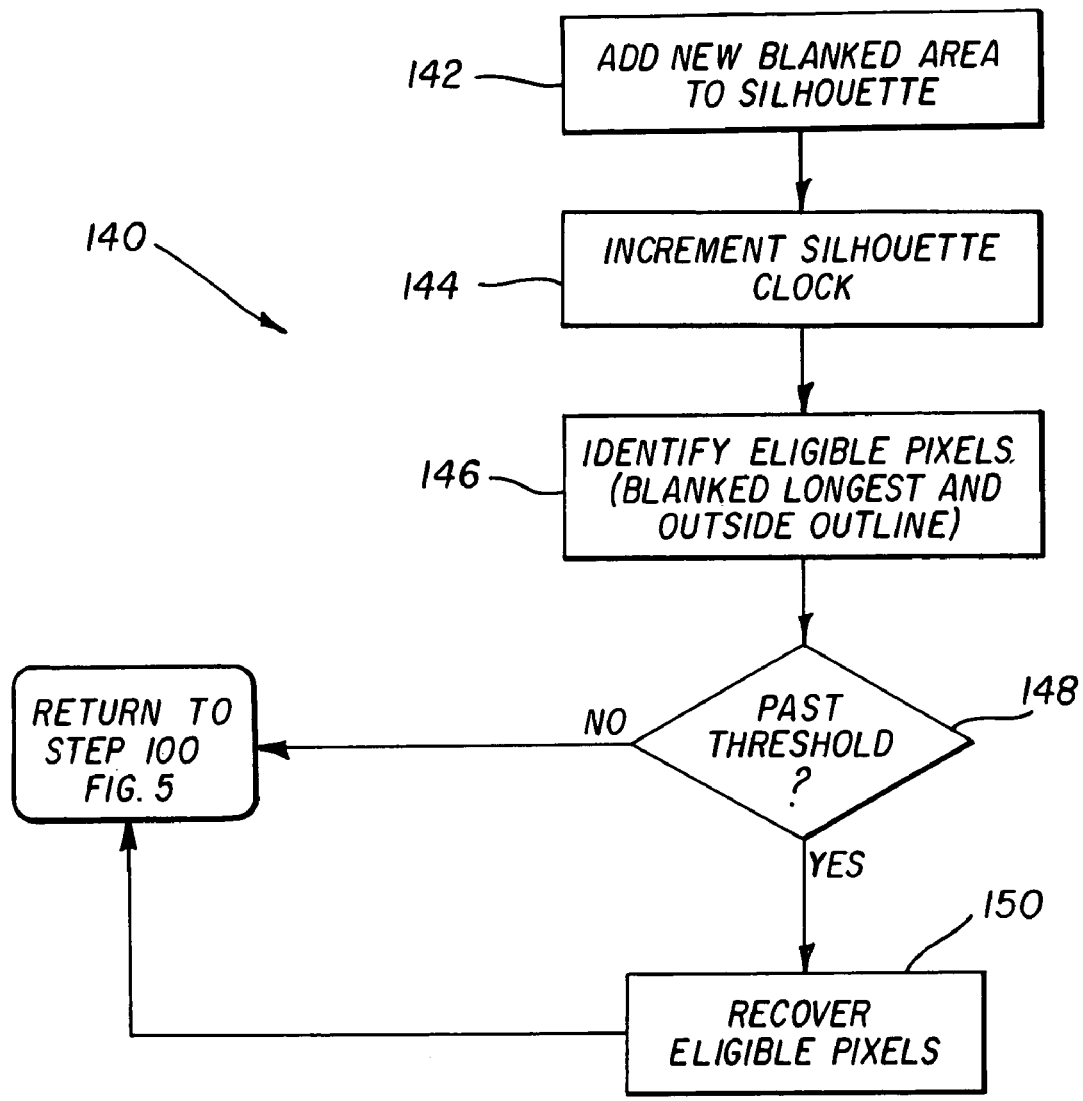
FIG. 6 is a flow chart showing the processing logic for the silhouette adjustment step of FIG. 5.
Figure 7A:
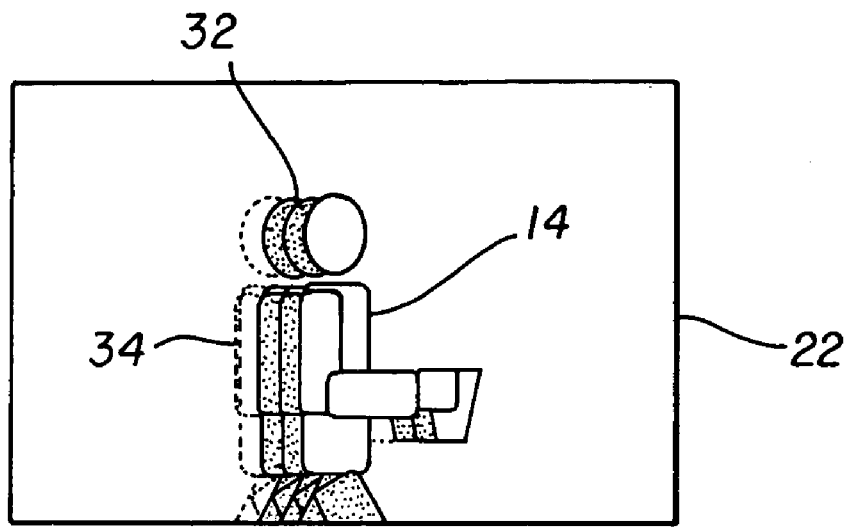
FIGS. 7a and 7b are plane views showing the sequence for accommodating movement and reclaiming pixels in a preferred embodiment of the present invention.
Figure 7B:
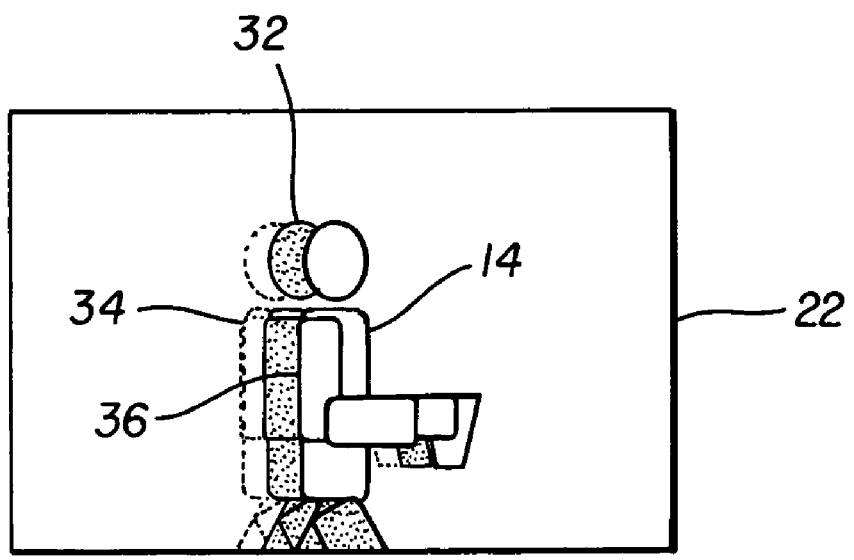

Referring to FIG. 6, there is shown a logic flow diagram illustrating the sequence followed as part of movement adjustment step 140. FIGS. 7a and 7b relate the steps of FIG. 6 to the display of image frame 22 on display surface 12. Referring now to FIG. 6, movement adjustment step 140 with an add area step 142 in which additional pixels are sensed in obstructed area 16 and are therefore added to blanked area 32. An increment silhouette clock step 144 follows, in order to maintain tracking of time for disabled pixels. In an eligibility identification step 146, pixels that are eligible to be re-enabled and projected in image frame 22 are identified. Referring now to FIGS. 7a and 7b, it can be seen that as viewer 14 moves in front of the area of image frame 22, trailing blanked areas 32 are disabled even though viewer 14 is no longer obstructing the pixels in these same blanked areas 32. A reclaimable area 34 includes pixels disabled for the longest period of time, as tracked using the silhouette clock started in initial blanking step 132 (FIG. 5) and incremented in increment silhouette clock step 144 (FIG. 6). An important procedure in identifying reclaimable area 34 is to detect an outline 36 as shown in FIG. 7b. Outline 36 of viewer 14, or of any object in the path of the projection beam, can be detected, since the boundary of obstructing viewer 14 or of some other obstructing object will be illuminated by light from the diffuse display surface 12. Detection of outline 36 by camera 20 and its associated scan control logic processor 28 provides a boundary for a probabilistic determination of where viewer 14 is currently located. Outline 36 can itself be tracked with each displayed image frame 22, whenever an obstructed area 16 is sensed. Returning to the sequence of FIG. 6, it can be seen that reclaimable area 34 can be defined in eligibility identification step 146. A threshold test step 148 is provided to allow a variable measure of delay for reclaiming reclaimable area 34. That is, once reclaimable area 34 is identified, it can be ascertained that sufficient delay has occurred for re-enabling pixels that had been previously blanked. If threshold timing conditions have not been met, blanked areas 32 are maintained and sensing continues, with a return to the procedural sequence given in FIG. 5. When threshold timing conditions have been met, pixels are recovered in a recovery step 150, with a subsequent return to the procedural sequence of FIG. 5.

It can be appreciated that the logic sequence of FIGS. 5 and 6 can be implemented in any number of ways in control logic. In whatever way this function is implemented, the preferred embodiment described herein shows the basic sequence needed for reclaiming blanked areas of image frame 22 for projection, once it can be determined that viewer 14 is no longer obstructing an area of display surface 12.

Camera 20 used for the purpose of this detection could be the same device already used for calibration of scanning operation by projection apparatus 18. Optionally, camera 20 can be adapted specifically for detecting obstructed area 16, as is described hereinbelow.

Using Separate Light Source for Detection by Camera 20

Referring again to FIG. 8, an alternative embodiment for defining obstructed area 16 employs an optional radiation source 46 matched with the wavelength sensitivity of camera 20. For example, radiation source 46 could be an infrared (IR) light source that is directed toward display surface 12. Camera 20 would then be adapted for sensitivity to IR radiation. Obstruction by viewer 14 or by some other object would be detected by camera 20 and its associated scan control logic processor 28 so that obstructed area 16 could be defined. This alternative embodiment has the advantage of sensing without using imaging light; therefore, movement adjustment step 140 as shown in FIG. 6 would not be needed when using a separate light source for sensing obstructed area 16. In addition, detection can occur over an area larger than image frame 22, allowing an additional margin of safety. Radiation source 46 could emit any suitable wavelength for detection, such as IR or other wavelengths not emitted from projection apparatus 18. Camera 20 could be provided with one or more filters for restricting its sensitivity to radiation source 46 only.

The positioning of radiation source 46 relative to display surface 12 determines how projection system 10 senses an obstruction. Referring again to FIG. 8, radiation source 46 can be directed at a somewhat oblique angle relative to display surface 12, so that light from radiation source 46 is effectively behind obstructing viewer 14; in such a case, obstructed area 16 may be identified as the region over which no light from radiation source 46 can be detected, since it is blocked by viewer 14. Alternately, radiation source 46 can be positioned so that it illuminates both display surface 12 and any obstructing viewer 14. In such a case, a number of methods can be used for sensing and responding to obstruction by viewer 14.

Among methods available for determining the location of obstructing viewer 14 are red-eye detection, facial feature detection, and motion detection. Red-eye detection techniques are described, for example, in U.S. Pat. No. 5,325,133, issued Jun. 28, 1994 to Adachi, entitled "Device for Measuring a Retina Reflected Light Amount and a Gaze Detecting Apparatus Using the Same" describes a device for measuring reflected light from a retina and detecting the direction in which the user is looking with an apparatus. This apparatus directs a number of sources of infrared emission, located at different positions, toward a user's eyes. The system locates the pupils by pattern recognition or by red-eye ("detecting the frequency components corresponding to hemoglobin which is abundantly contained in the light reflected by the retina"). Another patent relating to red-eye detection is U.S. Pat. No. 5,432,863 issued Jul. 11, 1995 to Benati et al., entitled "Automated Detection and Correction of Eye Color Defects Due to Flash Illumination". The Benati et al. '863 patent describes a means to automatically detect red-eye defects in a sensed image, based on shape, coloration, and brightness.

Among the numerous set of patents that provide facial feature recognition in an image are U.S. Pat. No. 6,184,926 entitled "System and Method for Detecting a Human Face in Uncontrolled Environments" to Khosravi et al. and U.S. Pat. No. 6,134,339 entitled "Method and Apparatus for Determining the Position of Eyes and for Correcting Eye-Defects in a Captured Frame" to Luo. Other patents directed to facial feature recognition include U.S. Pat. No. 5,719,951 entitled "Normalized Image Feature Processing" to Shackleton et al. and U.S. Pat. No. 6,600,830 entitled "Method and System of Automatically Extracting Facial Features" to Lin et al. Yet another patent disclosing facial feature recognition with motion detection is U.S. Pat. No. 6,301,370 entitled "Face Recognition from Video Images" to Steffens et al.

Referring again to FIG. 8, using a suitable combination of facial feature recognition utilities, image processor 30 can not only detect the general outline of obstructed area 16 (FIG. 3a), but can also determine the location of features of an obstructing viewer 14. With the use of a suitable wavelength for radiation source 46 and using red-eye detection techniques, projection system 10 can be adapted to block any laser radiation from the area around the eyes of viewer 14, whether viewer 14 is standing still or is in motion.

Figure 9:
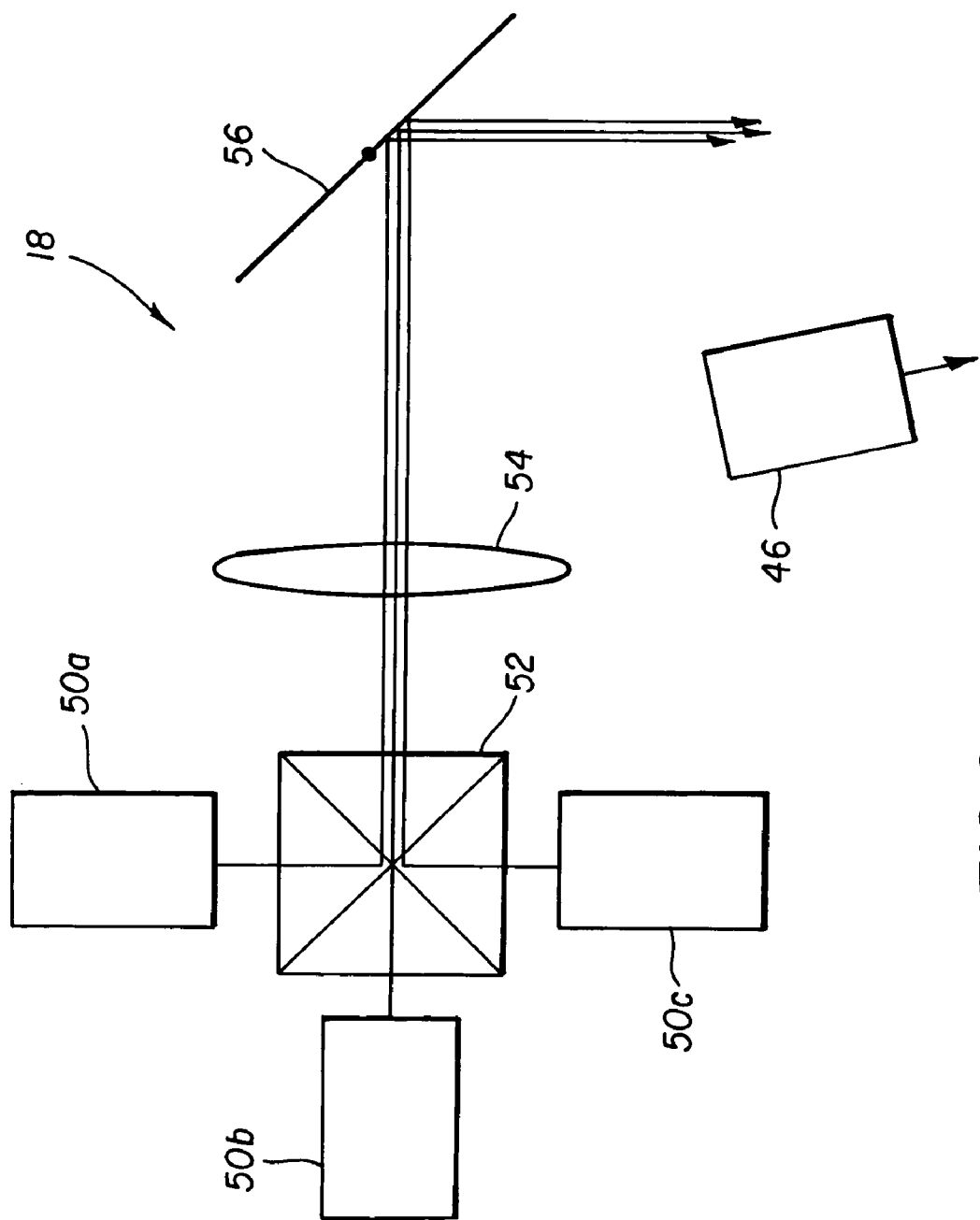
FIG. 9 is a simplified schematic block diagram showing a projector in an alternate embodiment of the present invention.

Referring to FIG. 9, there is shown an alternate embodiment in which radiation source 46 is part of projection apparatus 18. For each color that is projected, a laser light modulation assembly 50a, 50b, or 50c is provided. Within each laser light modulation assembly 50a, 50b, or 50c are one imaging laser having a desired wavelength (typically either Red, Green, or Blue) and one light modulator, such as a GEMS device with any necessary supporting mirrors, stops, and lenses, as is described, for example, in configurations shown in U.S. Pat. No. 6,552,855. The output from each laser light modulation assembly 50a, 50b, 50c is directed to a color combiner 52, such as an X-cube, and is then directed through a lens 54 to a scanning mirror 56. From scanning mirror 56, the line image generated at laser light modulation assembly 50a, 50b, or 50c is scanned toward display surface 12 (not shown in FIG. 9). Radiation source 46 is also provided for directing light to display surface 12. Radiation source 46, although not modulated, could alternately be scanned along with modulated light from laser light modulation assembly 50a, 50b, or 50c.

Figure 10:
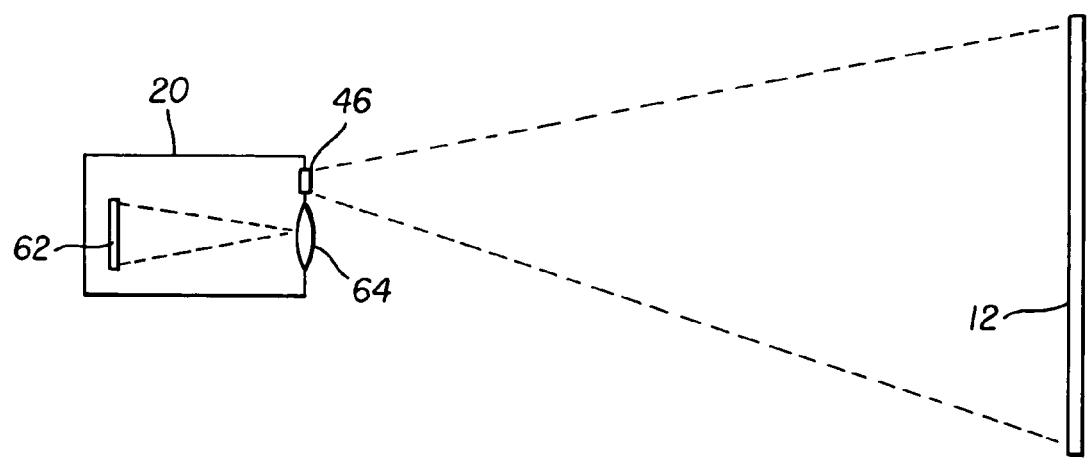
FIG. 10 is a schematic block diagram showing a projector apparatus adapted for sensing an obstruction; and, FIG. 11 is a plane view diagram showing one arrangement with multiple radiation sources surrounding a central sensing camera lens.
Figure 11:
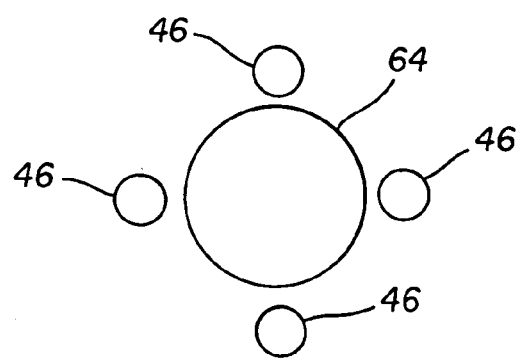

Referring to FIG. 10, there is shown an embodiment in which radiation source 46 is mounted close to objective lens 64 on camera 20. Using a near-IR radiation source 46 with this arrangement is most advantaged for detection of red-eye effects, which are most pronounced when the light source is near to the optical axis of objective lens 64. A sensor 62 within camera 20, typically a conventional CCD (Charge-Coupled Device) sensor or a CMOS (Complementary Metal Oxide Semiconductor) sensor, detects the reflected radiation from display surface 12. FIG. 11 shows an alternate arrangement in which multiple radiation sources 46 are disposed about objective lens 64. The arrangement of FIG. 11 allows lower power radiation sources 46 to be used.

While near-IR light is particularly advantaged, other wavelengths could be employed for use as radiation source 46. In another alternate embodiment, optional radiation source 46 could even be omitted and ambient light used instead. Camera 20 would be fitted with suitable filters to distinguish stray ambient light from projected light in order to determine whether or not there is an obstruction based on this detection.

Calibration of Camera 20

As is clear from the description of FIGS. 5 and 8, spatial calibration is required in order to identify exact pixel position on display surface 12 from camera 20. That is, camera 20 must first be calibrated so that each pixel position can be clearly identified and correlated to its corresponding pixel in the image data, as projected from projection apparatus 18. Calibration of camera 20 can be performed by projecting a set of fiducial markings that allow alignment of the pixel matrix sensed by this device. Some further calibration for relative pixel intensity might also be required.

Alternate Interlock Method

In an alternative embodiment, detection of obstruction using camera 20 can be used to temporarily disable projection altogether, until re-initiated by an operator. This interlock method may use shutters, for example, to temporarily stop projection of modulated laser light whenever display surface 12 is obstructed.

Another interlock solution for projection apparatus 18 monitors the motion of its internal scanning galvanometer. If galvanometer movement stalls or stops, a potentially hazardous condition is recognized and lasers 40 are disabled. This prevents the concentration of laser radiation at a fixed point with reference to display surface 12. Galvanometer sensing can be done, for example, by monitoring an encoder device that is in communication scanning components.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, scan control logic processor 28 can be a separate computer workstation or a dedicated microprocessor with support memory components. The functions of scan control logic processor 28 and image processor 30 can both be performed by the same logic circuitry, either on a separate workstation or on a controller that is packaged inside projection apparatus 18 or separate from that device. Any number of feature detection algorithms could be employed for locating the eyes of an obstructing viewer 14. The control logic for blanking specific pixels and for reclaiming pixels could be adapted and implemented in a number of different ways, in the spirit of the present invention.

In a preferred embodiment, the apparatus of the present invention uses a GEMS or GLV linear spatial light modulator. Alternately, the apparatus of the present invention could employ an area spatial light modulator, such as an LCD or DMD component. However, these area spatial light modulators are not ideally suited for laser illumination. The LCD spatial light modulator is further disadvantaged due to its relatively slow response time.

Thus, what is provided is an apparatus and method for selectively disabling a scanned laser projection apparatus to prevent viewer exposure.

PARTS LIST

10 Projection system
12 Display surface
14 Viewer
16 Obstructed area
18 Projection apparatus
20 Camera
22 Image frame
24 Difference frame
26 Scan lines
28 Scan control logic processor
30 Image processor
32 Blanked area
34 Reclaimable area
36 Outline
40 Laser
42 Image modulator
43 Modulated laser light
44 Projection optics
46 Radiation source
50a, 50b, 50c Laser light modulation assembly
52 Color combiner
54 Lens
56 Scanning mirror
62 Sensor
64 Objective lens
100 Display step
110 Comparison step
120 Threshold query step
130 Initial detection query step
132 Initial blanking step
140 Movement adjustment step
142 Add area step
144 Increment silhouette clock step
146 Eligibility identification step
148 Threshold test step
150 Recovery step

What is claimed is:

1. A projection apparatus for forming an image frame on a display surface, wherein the image frame comprises a two-dimensional array of pixels, the apparatus comprising:
   (a) a projector that directs an image-bearing beam toward the display surface; comprising:
      (i) a laser light source;
      (ii) an image modulator that modulates said laser light source to form said image-bearing beam, according to image data;
      (iii) projection optics that project said image-bearing beam toward the display surface to form the image frame;
   (b) a camera that obtains a sensed pixel array by sensing the two-dimensional array of pixels of the image frame formed on the display surface by said image-bearing beam;
   (c) a control logic processor that compares said sensed pixel array with corresponding said image data for the image frame to identify any portion of said image-bearing beam that is obstructed from the display surface and for disabling pixels within said obstructed portion of said image-bearing beam for a plurality of subsequent image frames.

2. A projection apparatus according to claim 1 wherein said image modulator is taken from the group consisting of GEMS devices and GLV devices.

3. A projection apparatus according to claim 1 wherein said image modulator is taken from the group consisting of DMD and LCD area spatial light modulators.

4. A projection apparatus according to claim 1 further comprising a scanner for forming the two-dimensional array of pixels from said image-bearing beam.

5. A projection apparatus according to claim 1 wherein said control logic processor disables pixels within said obstructed portion of said image-bearing beam by controlling said image modulator.

6. A projection apparatus according to claim 1 wherein said camera comprises a charge-coupled device.

7. A projection apparatus according to claim 1 wherein said camera comprises a CMOS sensing device.

8. A projection apparatus according to claim 1 wherein said control logic processor applies a motion detection algorithm for identifying said obstruction of said portion of said image-bearing beam.

9. A projection apparatus according to claim 1 wherein said control logic processor applies a facial recognition algorithm for disabling pixels of said obstructed portion of said image-bearing beam.

10. A projection apparatus according to claim 1 wherein said control logic processor applies a red-eye detection algorithm for disabling pixels of said obstructed portion of said image-bearing beam.

11. The projection apparatus claimed in claim 1, wherein the camera senses an outline of an obstruction to said image bearing beam and the control logic processor, cooperating with the projector, re-claims pixels outside said outline after a predetermined time interval.

12. A projection apparatus for forming an image frame on a display surface, wherein the image frame comprises a two-dimensional array of pixels, the apparatus comprising:
(a) a projector that directs an image-bearing beam toward the display surface, comprising:
 (i) a laser light source;
 (ii) an image modulator that modulates said laser light source to form said image-bearing beam as a line of pixels, according to image data;
 (iii) projection optics that project said image-bearing beam as a series of scanned lines toward the display surface to form the image frame;
(b) a camera that obtains a sensed pixel array by sensing the two-dimensional array of pixels of the image frame formed on the display surface by said image-bearing beam;
(c) a scan control logic processor that compares said sensed pixel array with corresponding said image data for the image frame to identify any portion of said image-bearing beam that is obstructed from the display surface and for disabling pixels within said obstructed portion of said image-bearing beam for a plurality of subsequent image frames.

13. A projection apparatus according to claim 12 wherein said image modulator is taken from the group consisting of GEMS devices and GLV devices.

14. A projection apparatus according to claim 12 wherein said scan control logic processor disables pixels within said obstructed portion of said image-bearing beam by controlling said image modulator.

15. A projection apparatus according to claim 12 wherein said camera comprises a charge-coupled device.

16. A projection apparatus according to claim 12 wherein said camera comprises a CMOS sensing device.

17. A projection apparatus for forming an image frame on a display surface, wherein the image frame comprises a two-dimensional array of pixels, the apparatus comprising:
(a) a projector that directs a multicolor image-bearing beam toward the display surface, comprising:
 (i) an image generation system comprising:
  (1) a plurality of imaging laser light sources, each imaging laser light source having an imaging wavelength; and,
  (2) for each said imaging laser light source, an image modulator that modulates light from said imaging laser light source to form a monochrome image-bearing beam according to image data;
 (ii) color combining optics that combine said monochrome image-bearing beam from each imaging laser light source to form a multicolor image-bearing beam;
 (iii) projection optics that project said multicolor image-bearing beam toward the display surface to form the image frame;
(b) a camera that senses an obstruction between said projector and the display surface by detecting reflected ambient light from the obstruction, wherein the camera includes filters to distinguish the ambient light from projected light; and,
(c) a control logic processor for defining an obstructed area of the display surface according to said obstruction sensed by said camera and for disabling corresponding said image data to each said image modulator, blanking the multicolor image beam over said obstructed area thereby.

18. A projection apparatus according to claim 17 further comprising a radiation source directed toward the display surface for providing said reflected light.

19. A projection apparatus according to claim 18 wherein said radiation source is an IR source.

20. A projection apparatus according to claim 17 wherein said reflected light originates from a radiation source on said projector.

21. A projection apparatus according to claim 17 wherein said reflected light originates from ambient light.

22. A projection apparatus according to claim 17 wherein said image modulator is taken from the group consisting of GEMS devices and GLV devices.

23. A projection apparatus according to claim 17 wherein said image modulator is taken from the group consisting of DMD and LCD area spatial light modulators.

24. A projection apparatus according to claim 17 further comprising a scanner for forming the two-dimensional array of pixels from said multicolor image-bearing beam.

25. A projection apparatus according to claim 17 wherein said camera comprises a charge-coupled device.

26. A projection apparatus according to claim 17 wherein said camera comprises a CMOS sensor device.

27. A method for forming successive image frames on a display surface, wherein each image frame comprises a two-dimensional array of pixels, the method comprising:
(a) forming an image frame on the display surface, comprising:
 (i) energizing at least one laser light source;
 (ii) modulating said at least one laser light source and forming said image-bearing beam, according to image data;
 (iii) projecting said image-bearing beam toward the display surface;
(b) obtaining a sensed pixel array by sensing the two-dimensional array of pixels of the image frame formed on the display surface by said image-bearing beam;
(c) comparing said sensed pixel array with corresponding said image data for the image frame and identifying any portion of said image-bearing beam that is obstructed from the display surface; and,
(d) disabling pixels within at least said obstructed portion of said image-bearing beam for a plurality of subsequent image frames.

28. A method for forming an image frame according to claim 27 wherein the step of modulating said at least one laser light source comprises the step of modulating a GEMS device.

29. A method for forming an image frame according to claim 27 wherein the step of modulating said at least one laser light source comprises the step of modulating a GLV device.

30. A method for forming an image frame according to claim 27 wherein the step of modulating said at least one laser light source comprises the step of modulating a digital micromirror device.

31. A method for forming an image frame according to claim 27 further comprising the steps of:
(a) sensing an outline of an obstruction to said image bearing beam; and,
(b) after a predetermined time interval, re-enabling pixels outside said outline.

32. A method for forming an image frame according to claim 27 wherein the step of identifying any portion of said image-bearing beam that is obstructed further comprises the step of applying a motion detection algorithm.

33. A method for forming an image frame according to claim 27 wherein the step of identifying any portion of said image-bearing beam that is obstructed further comprises the step of applying a facial recognition algorithm.

34. A method for forming an image frame according to claim 27 wherein the step of identifying any portion of said image-bearing beam that is obstructed further comprises the step of applying a red-eye detection algorithm.

35. A method for forming an image frame on a display surface, wherein the image frame comprises a two-dimensional array of pixels, the method comprising:
  (a) directing a multicolor image-bearing beam toward the display surface, comprising:
    (i) providing a plurality of imaging laser light sources, each imaging laser light source having an imaging wavelength;
    (ii) for each said imaging laser light source, modulating light from said imaging laser light source and thereby forming a monochrome image-bearing beam according to image data;
    (iii) combining said monochrome image-bearing beam from each imaging laser light source and forming a multicolor image-bearing beam;
    (iv) projecting said multicolor image-bearing beam toward the display surface and forming the image frame;
  (b) identifying any portion of said image-bearing beam that is obstructed by a viewer's eye or eyes with a camera and a red-eye detection algorithm; and,
  (c) disabling said image-bearing beam in an area around the eyes of the viewer.

36. A method for forming an image frame according to claim 35 wherein the step of modulating said at least one laser light source comprises the step of modulating a GEMS device.

37. A method for forming an image frame according to claim 35 wherein the step of modulating said at least one laser light source comprises the step of modulating a GLV device.

38. A method for forming an image frame according to claim 35 wherein the step of modulating said at least one laser light source comprises the step of modulating a digital micromirror device.

39. A method for forming an image frame according to claim 35 further comprising the steps of:
  (a) sensing an outline of an obstruction to said image bearing beam; and,
  (b) after a predetermined time interval, re-enabling pixels outside said outline.

40. A method for forming an image frame according to claim 35 wherein the step of identifying any portion of said image-bearing beam that is obstructed further comprises the step of applying a motion detection algorithm.

41. A method for forming an image frame according to claim 35 wherein the step of identifying any portion of said image-bearing beam that is obstructed further comprises the step of applying a facial recognition algorithm.

42. A method for forming an image frame according to claim 35 further comprising the step of directing a radiation source toward the display surface for reflection to camera (20).

43. A method for forming an image frame according to claim 42 wherein the step of directing a radiation source toward the display surface comprises the step of energizing a near-IR source.

44. A method for forming an image frame on a display surface, wherein the image frame comprises a two-dimensional array of pixels, the method comprising:
  (a) directing a multicolor image-bearing beam toward the display surface, comprising:
    (i) providing a plurality of imaging laser light sources, each imaging laser light source having an imaging wavelength;
    (ii) for each said imaging laser light source, modulating light from said imaging laser light source and thereby forming a monochrome image-bearing beam according to image data;
    (iii) combining said monochrome image-bearing beam from each imaging laser light source and forming a multicolor image-bearing beam;
    (iv) projecting said multicolor image-bearing beam toward the display surface and forming the image frame;
  (b) sensing an obstruction between said projector and the display surface with a camera by detecting reflected ambient light from the obstruction, wherein the camera includes filters to distinguish the ambient light from projected light; and,
  (c) disabling corresponding said image data for said obstructed area of pixels corresponding to each said imaging laser light source, blanking the multicolor image beam over said obstructed area of pixels thereby.

* * * * *